Figure 1:
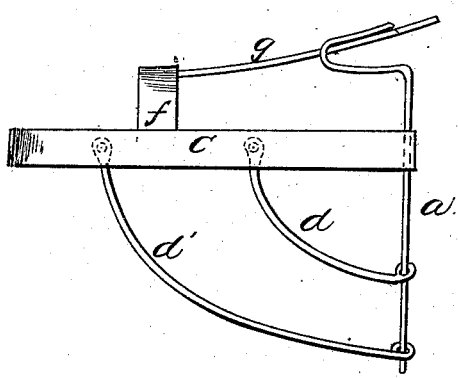
Figure 2:
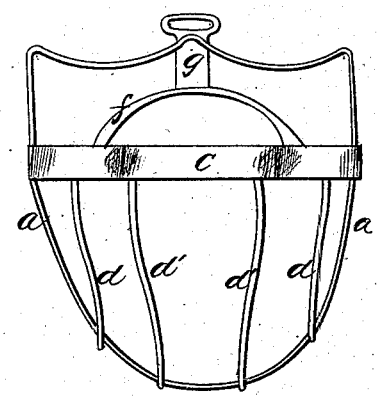

C. F. Schmidt,
Dog Muzzle,

N° 31,911. Patented Apr. 2, 1861.

Witnesses:

Inventor.
Chr. Friedrich Schmidt

UNITED STATES PATENT OFFICE.

C. FRIEDRICK SCHMIDT, OF WILLIAMSBURG, NEW YORK.

MUZZLE FOR DOGS AND OTHER ANIMALS.

Specification of Letters Patent No. 31,911, dated April 2, 1861.

*To all whom it may concern:*

Be it known that I, CHRISTIAN FRIEDRICK SCHMIDT, of Williamsburg, in the county of Kings and State of New York, have invented a new and Improved Dog-Muzzle; and I do hereby declare that the following is a full and exact description of the same, reference being had to the accompanying drawings and to the letters of reference marked thereon.

Figure I represents a side view and Fig. II an end view of my improved muzzle.

The nature of my invention consists in the construction of a muzzle for dogs or similar animals, so arranged that the muzzle does not require to be taken off, for the purpose of allowing the animal to eat, at the same time acts as a sure preventive against his biting. For this purpose I make a frame, $a$, which passes around the after part of the dog's head, and which by means of straps or bands is held on fast. To this frame, $a$, a strong bar, $b$, is fastened passing along the sides and around the front or nose of the dog.

$d$, $d'$, are smaller bars running from different points of the bar, $b$, to the frame, $a$, in a direction about parallel to each other, and bend to the shape of the lower part of the dog's head, and at the same time to allow the free use of the lower jaw. The two central bars, $d'$, are of sufficient distance apart to allow the production of the tongue between the same. On the upper part of the bar, $b$, a bar, $f$, is fastened, which may likewise be attached to the frame, $a$, by means of a rod or bar, $g$. This bar $f$ rests on the dog's or animal's nose, and holds the muzzle up. This bar, $f$, may be covered or lined with some soft material to prevent the weight of the muzzle hurting the animal.

As before mentioned the bars $d'$ will allow the free production of the tongue, and at the same time the introduction of food, while the bar, $b$, will effectually prevent his biting.

What I claim as my invention and desire to secure by Letters Patent is—

The herein described muzzle for dogs or similar animals constructed in the manner and for the purpose set forth.

CHR. FRIEDRICK SCHMIDT.

Witnesses:
P. G. GARDINER,
HENRY E. ROEDER.